United States Patent [19]

Winterhalter

[11] 4,313,629
[45] Feb. 2, 1982

[54] HOSE CONNECTOR

[75] Inventor: Melvin J. Winterhalter, Toledo, Ohio

[73] Assignee: Champion Spark Plug Company, Toledo, Ohio

[21] Appl. No.: 168,749

[22] Filed: Jul. 14, 1980

[51] Int. Cl.³ .................. F16L 33/02; F16L 33/20
[52] U.S. Cl. .................................. 285/242; 285/256
[58] Field of Search ............. 285/252, 253, 149, 259, 285/256, 242, 244, 245, 239, 240, 241, 55

[56] References Cited

U.S. PATENT DOCUMENTS

| | | | |
|---|---|---|---|
| 1,227,690 | 5/1917 | Subers | 285/253 |
| 2,139,745 | 12/1938 | Goodall | 285/253 |
| 2,299,171 | 10/1942 | Muller | 285/149 |
| 2,401,921 | 6/1946 | Fisher et al. | 285/256 |
| 2,741,496 | 4/1956 | Melsom | 285/149 |
| 3,720,235 | 3/1973 | Schrock | 285/259 X |
| 4,072,330 | 2/1978 | Brysch | 285/332 |

FOREIGN PATENT DOCUMENTS 2721090 12/1977 Fed. Rep. of Germany ...... 285/253

Primary Examiner—Thomas F. Callaghan
Attorney, Agent, or Firm—Emch, Schaffer & Schaub

[57] ABSTRACT

A connector apparatus comprising a hose having a resilient core with a resilient cover over the core. A passageway is defined in the center of the resilient core. At one end of the hose the core has a region of reduced thickness that produces an increased inside diameter in the passageway at the end of the hose. A connector is engageably positioned in the passageway in the hose at the end where the core has a reduced thickness. The connector has an enlarged diameter portion and the enlarged diameter portion has a diameter larger than the inside diameter of the passageway in the hose. Clamping means is positioned on the exterior of the hose at the end where the connector is positioned in the passageway of the hose. The clamping means sealingly secures the connector in the hose.

20 Claims, 6 Drawing Figures

HOSE CONNECTOR

BACKGROUND OF THE INVENTION

This invention pertains to a connector for use with a hose that has a nylon core with rubber sheath over the nylon core. In one of the more specific aspects, the present invention relates to a metal connector having an upset which is positioned in the end of the hose where a portion of the nylon core has been removed.

The hose and connector of this invention are normally used to make connections to carburators, gas tanks, metal fuel lines and other similar applications. In the past connectors had to be permanently attached to each end of the hose to allow the hose to be connected to other structures. The connectors had female swivel nuts that attached to a male adapter. The female swivel nut and the male adapter would each have to be permanently affixed to either the hose or the structure to which the hose was being connected. The location of the female or male portion of the connector can vary depending on the application in which the hose was being used. However, since the female and male portions of the connector can be located on either the hose or the structure to which the hose is being attached anyone desiring to replace the hose would have to be familiar with the location of the components of the connector to obtain a suitable replacement hose. Further, since the connectors are permanently attached to the hose, the hose must be accurately sized to insure that the hose is the appropriate length for that installation.

Accordingly, there is a need for a connector and hose aassembly that provides quick, leak-free connections where the connector can be installed in the hose in the field and the connector is positioned on the hose to simplify later connections with other pieces of equipment.

According to the invention, there is provided connector apparatus comprising a hose having a resilient core with a resilient covering over the core. A passageway is defined in the center of the resilient core. At one end of the hose the core has a region of reduced thickness that produces an increased inside diameter in the passageway at the end of the hose. A connector is engageably positioned in the hose at the end where the core has a reduced thickness. The connector has an enlarged diameter portion and the enlarged diameter is larger than the inside diameter of the hose. A clamp is positioned on the exterior of the hose at the end where the connector is positioned in the hose. The clamp sealingly secures the connector in the hose.

It is an object of the invention to provide an improved connector for use in a hose having a resilient core and a resilient outer covering over the core.

DESCRIPTION OF THE PREFERRED EMBODIMENT

Figure 1:
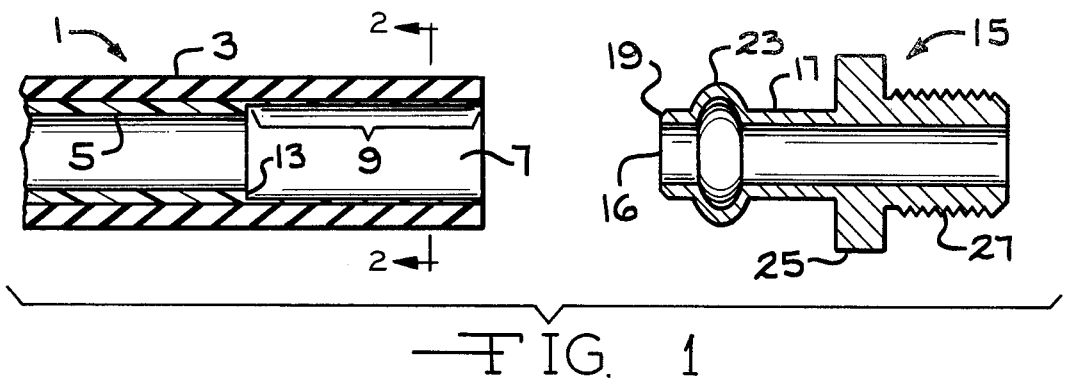
FIG. 1 is a side cross sectional view of the hose and the connector.
Figures 2, 3:
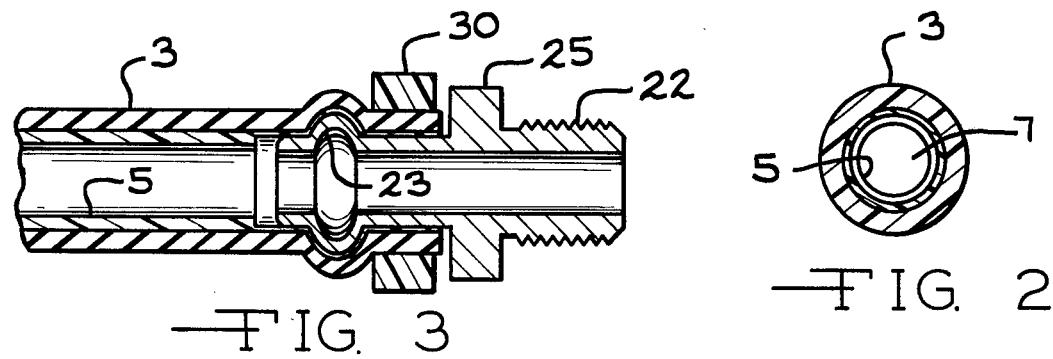
FIG. 2 is a cross sectional view of the end of the hose taken along line 2—2 in FIG. 1.
FIG. 3 is a side cross sectional view of the connector positioned in the hose.

The features of the present invention will be more readily understood by referring to FIGS. 1, 2 and 3 of the attached drawings in connection with the following description. The connector apparatus of this invention has a hose 1 having a resilient outer rubber covering 3 and a resilient nylon tube or core 5. The core of the hose has been described as being a nylon material. However, it should be recognized that a number of plastic or other materials can be used as the core material. The core material is normally selected to be compatable with the material being transported in the hose. Therefore, the material being transported in the hose and the end use of the hose will be factors in deciding what material will be used as the core material. Different materials can also be used to form the outer covering for the hose. Again the material selected may depend on the end use for the hose. However, for ease of explanation the core and outer covering will be hereinafter referred to as being nylon and rubber respectively.

The nylon core 5 in the hose defines an aperture or passageway 7 in the center of the hose. At least one end of the hose 1 has a region 9 where the nylon core 5 has a reduced thickness. The reduced thickness of the nylon core 5 in the region 9 increases the inside diameter of the hose in the region 9. A shoulder 13 is produced in the nylon core at the point where the region of reduced thickness begins. Normally, the area of reduced thickness of the nylon core 5 will extend from the shoulder 13 to the end of the hose 1.

The region 9 of reduced thickness of the nylon core 5 is produced by drilling or reeming out the nylon core positioned in the interior of the hose 1. During the reeming process from about 25% to about 97% of the thickness of the nylon core is removed. In a normal application the nylon core will be reemed or drilled to reduce the thickness of the nylon core for a distance of approximately 1" from the end of the hose.

A connector 15 is positioned in the aperture 7 defined by the nylon core 5 in the hose. The connector is located in the region 9 where the thickness of the nylon core 5 has been reduced. The outside diameter 17 of the connector 15 is usually slightly larger than the inside diameter of the nylon core 5 in the region 9 of the hose 1. The end 16 of the connector has a beveled edge 19. The portion of the connector 15 normally positioned in the hose 1 is substantially the same length as the region 9 of reduced thickness for the nylon core 5. The beveled edge 19 of the end 16 of the connector 15 will normally be in contact with the shoulder 13 in the nylon core 5 when the connector 15 is properly positioned in the hose 1.

The connector 15 also contains an enlarged diameter portion or upset 23. The upset 23 is located on the portion of the connector 15 that is positioned in the aperture 7 in the hose 1. The diameter of the upset 23 is about 15% to about 40% larger than the diameter of the rest of the connector 15 that is positioned in the hose. The end of the connector 15 that extends from the hose 1 normally has a hex nut 25 and threaded connection 27 for connecting the hose and connector to other equipment.

A compression ring or clamp 30 is positioned on the exterior of the hose 1. The clamp is usually positioned between the upset 23 and the end of the hose 1. The clamp acts to sealingly secure the hose 1 around the connector 15.

To construct the connector of the embodiment shown in FIGS. 1, 2 and 3 the nylon core 5 of the hose is reemed or drilled to increase the inside diameter of the tube on at least one end of the hose. The removal of the nylon core creates a shoulder at the point the increased diameter section of the nylon core terminates. The increased diameter section of the nylon core is large enough to accept the end 16 of the connector 15. As the connector 15 is inserted into the tube the tube will have to expand further to accept the upset 23 on the connector. Reducing the thickness of the nylon core in the tube allows the tube to expand more easily to accept the connector 15 and the upset portion 23 of the connector. Material is removed from the nylon core for a distance along the length of the hose to allow the beveled end 19 of the connector 15 to engage the shoulder 13 when the connector is fully inserted into the hose 1. The position of the beveled end 19 of the connector 15 in contact with the shoulder 13 will help to provide a seal between the hose 1 and the connector 15. In addition, the upset 23 will also securely engage the interior of the tube to provide a seal between the hose and the connector 15.

The clamp 30 is positioned between the upset 23 and the end of the hose. Accordingly, the clamp acts to hold the connector 15 in the hose 1 as the upset 23 cannot pass beneath the restricted diameter created by the clamp 30. The clamp 30 also acts to compress the hose against the connector 15 to form a tight seal between the hose and the connector 15. The core and outer covering for the hose must be resilient enough to accept the connector and to form a good seal between the hose and the connector.

Once the nylon core 5 has been correctly sized the connector 15 can be positioned in the hose and the clamp 30 secured on the exterior of the hose to complete the assembly of the connector. This provides a quick leakfree joining of the connector 15 and the hose 1.

Figure 4:
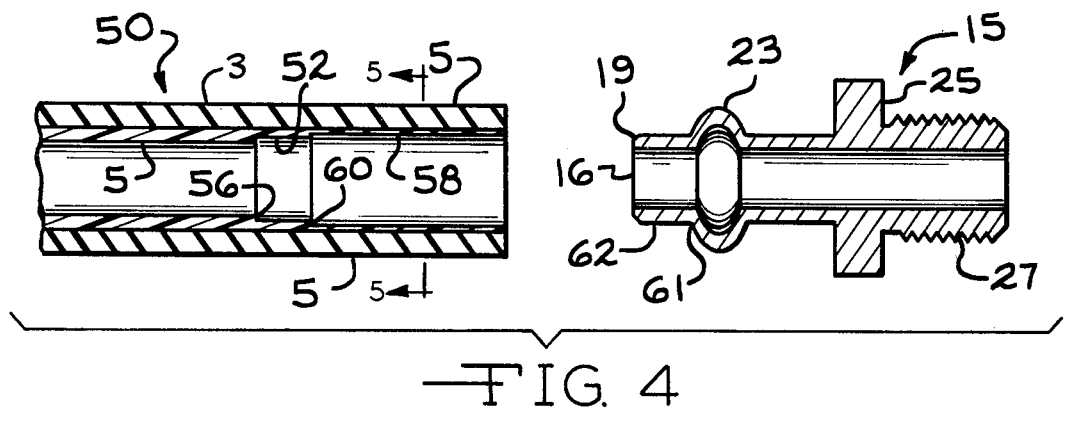
FIG. 4 is a side cross sectional view of a hose and connector showing another embodiment of the present invention.
Figures 5, 6:
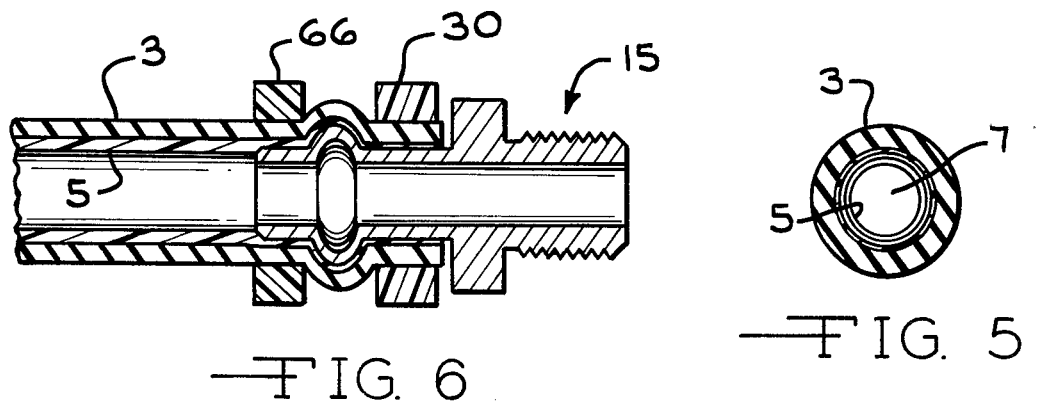
FIG. 5 is a cross sectional view of the end of the hose taken along 5—5 in FIG. 4.
FIG. 6 is a side cross sectional view of the connector positioned in the hose for the additional embodiment of the present invention.

FIGS. 4, 5 and 6 show an additional embodiment of the present invention. The features of this embodiment will be more readily understood by referring to FIGS. 4, 5 and 6 of the attached drawings in connection with the following description.

A hose 50 is provided having an outer rubber covering 3 and a nylon core 5. The nylon core 5 in the hose defines an aperture 7 in the center of the hose. In the interior of the hose there is a first region 52 where the nylon core 5 has a reduced thickness. The reduced thickness of the nylon core in the region 52 increases the inside diameter of the hose in the region 52. The nylon core 5 in the region 52 is of a thickness from about 50 to about 85% of the original thickness of the nylon core 5. A shoulder 56 in the nylon core is located at the point where the region 52 of reduced thickness begins. The region 52 of reduced thickness extends from the shoulder 56 towards the end of the hose 50.

A second region 58 of reduced thickness in the nylon core 5 is located in the hose adjacent to the first region 52. In the second region 58 the nylon core is of a thickness from about 2 to about 30% of the original thickness of the nylon core 5. In the second region 58 the nylon core has a thickness that is less than the thickness of the nylon core in the first region 52. A second shoulder 60 is located in the nylon core where the second region 58 abuts the first region 52. The second region 58 of reduced thickness extends from the shoulder 60 to the end of the hose 50.

The first region 52 and second region 58 of reduced thickness in the nylon core are produced by drilling or reeming out the nylon core positioned within the hose 50. A two step drilling or reeming process may be required to produce the first and second regions of reduced thickness in the nylon core material.

A connector 15, as previously described, is positioned in the aperture 7 defined by the nylon core 5 in the hose 50. The outside diameter 17 of the connector 15 is usually slightly larger than the inside diameter of the nylon core 5 in the second region 58 of reduced thickness. The connector 15 is positioned in the hose 50 in the manner previously described.

The length of the first region 52 of reduced thickness in the nylon core 5 is substantially the same length as the portion 62 of the connector located between the end 16 and the beginning 61 of the upset 23 on the connector 15. The first region 52 of reduced thickness will be in contact with the portion 62 of the connector 15 when the connector 15 is properly positioned in the hose 50. In this arrangement the beveled edge 19 of the end 16 of the connector 15 will abut against the first shoulder 56 in the nylon core material 5. The second region 58 of reduced thickness in the core material 5 extends from initiation 61 of the upset 23 to the end of the hose 50. In other words, the region 62 of the connector will be in contact with the first region 52 of reduced thickness and the upset 23 and the remainder of the connector 15 positioned in the hose 50 will be in contact with the second region 58 of reduced thickness of the nylon core material 5. The second shoulder 60 will normally be in engagement with the beginning 61 of the upset 23.

The connector 15 is inserted into the aperture 7 at the end of the hose 50 and the hose 50 expands to accept the end 16 of the connector. As the connector is inserted further into the tube the tube will have to expand further to accept the upset 23 on the connector. The second region 58 of reduced thickness of the nylon core 5 has less nylon material and is more resilient than the rest of the hose. Therefore, the second region 58 is able to more readily expand to accept the upset 23. The first region 52 of reduced thickness will not be as resilient as it contains a thicker section of nylon core material 5. Accordingly, the first region 52 of reduced thickness will not expand as readily as the second region 58. This construction for the hose 50 allows a tight seal to be maintained between the first region 52 of reduced thickness in the nylon core 5 and the region 62 on the connector. A tight seal is also maintained between the second region 58 of reduced thickness and the upset 23 on the connector.

The position of the beveled end 19 of the connector 15 in contact with the shoulder 56 also provides a seal between the hose 50 and the connector 15. The position of the beginning 61 of the upset 23 in contact with the second shoulder 60 provides another seal between the hose 50 and the connector 15.

As previously described, a clamp 30 can be positioned between the upset 23 and the end of the hose 50. The clamp acts to hold the connector 15 in the hose as the upset 23 cannot pass beneath the restricted diameter created by the clamp 30. The clamp 30 also compresses the hose 50 against the connector 15 to insure that a tight seal is formed between the hose and the connector. In addition, a second clamp 66 may be positioned on the hose in the area of the first region 52 of reduced thickness in the nylon core 5. The second clamp 66 will act to compress the hose 50 against the region 62 of the connector 50 form a tight seal between the hose and this portion of the connector.

Having described the invention in detail and with reference to the drawings it will be understood that such specifications are given only for the sake of explanation. Various modifications and substitutes other than those cited can be made without departing from the scope of the invention as defined by the following claims.

What I claim is:

1. Connector apparatus comprising:
   a hose having a resilient core with a resilient cover over said core, a passageway being defined in the center of said core, said core having an annular region of reduced thickness at one end of said hose, said region of reduced thickness producing an increased inside diameter in said passageway at said end of hose;
   a connector engagably positioned in said passageway in said hose at said end where said core has a region of reduced thickness, said connector having an annular enlarged diameter portion, said enlarged diameter portion having a diameter larger than the inside diameter of said region of reduced thickness in said hose; and
   clamping means positioned on the exterior of said hose at the end where said connector is positioned in said hose, said clamping means sealingly securing said connector in said region of reduced thickness of said hose.

2. The connector of claim 1 wherein said core contains a shoulder at the juncture of said core and said region of reduced thickness in said core.

3. The connector of claim 2 wherein the end of said connector positioned in said region of reduced thickness in said hose is sealingly positioned against said shoulder in said core.

4. The connector of claim 1 wherein the end of said connector positioned in said region of reduced thickness in said hose contains beveled edges.

5. The connector of claim 1 wherein said region of reduced thickness is from about 3% to about 50% of the thickness of said core in the rest of said hose.

6. The connector of claim 5 wherein said region of reduced thickness has increased resilience to facilitate the insertion of said connector in said passageway in said hose.

7. The connector of claim 1 wherein said enlarged diameter section of said connector has a diameter from about 15% to about 40% larger than the diameter of the rest of said connector that is positioned in said hose.

8. The connector of claim 1 wherein said region of reduced thickness in said core is substantially the same length as the portion of said connector that is positioned in said hose.

9. The connector of claim 1 wherein said resilient core is a nylon material.

10. The connector of claim 1 wherein said resilient outer covering is a rubber material.

11. Connector apparatus comprising:
    a hose having a resilient core with a resilient covering over said core, a passageway being defined in the center of said core, said core having a first and a second annular region of reduced thickness in at least one end of said hose, said regions of reduced thickness producing an increased inside diameter in said passageway at said end of said hose;
    a connector engageably positioned in said passageway in said hose at said end where said core has said regions of reduced thickness, said connector having an annular enlarged diameter portion, said enlarged diameter portion having a diameter that is larger than the inside diameter of said regions of reduced thickness; and
    at least one clamp positioned on the exterior of said hose in the region where said connector is positioned in said regions of reduced thickness of said hose, said clamp sealingly securing said connector in said hose.

12. The connector of claim 11 wherein said first region of reduced thickness is adjacent a full thickness portion of said core.

13. The connector of claim 12 wherein a first shoulder is located in said passageway at the juncture of said core and said first region of reduced thickness of said core.

14. The connector of claim 11 wherein said second region of reduced thickness extends from said first region of reduced thickness to said end of said hose.

15. The connector of claim 14 wherein a second shoulder is located in said passageway at the juncture of said first region of reduced thickness and said second region of reduced thickness.

16. The connector of claim 11 wherein the thickness of said second region of reduced thickness is less than the thickness of said first region of reduced thickness.

17. The connector of claim 16 wherein said enlarged diameter portion of said connector engages said second region of reduced thickness in said passageway of said core.

18. The connector of claim 11 wherein clamps are positioned on said hose on each side of said enlarged diameter portion of said connector.

19. The connector of claim 11 wherein said core is a nylon material.

20. The connector of claim 11 wherein said outer covering is a rubber material.

* * * * *